Jan. 24, 1939.  A. E. ROY  2,144,854
PNEUMATIC CONTROL APPARATUS
Filed May 19, 1937  2 Sheets-Sheet 1
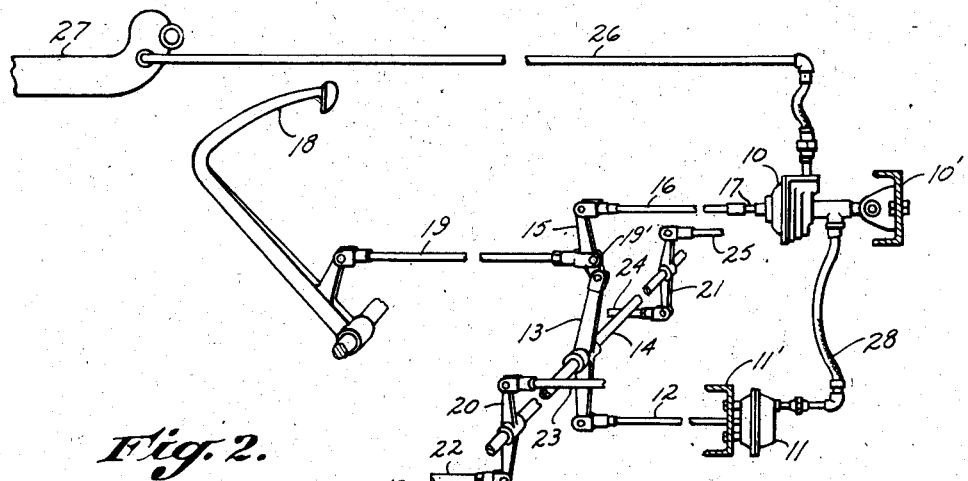
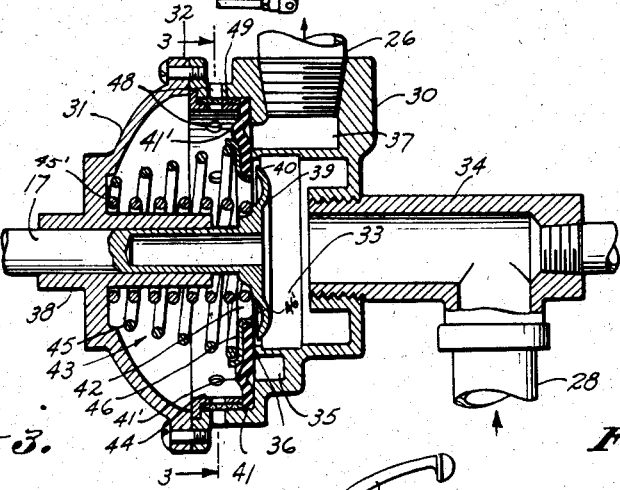
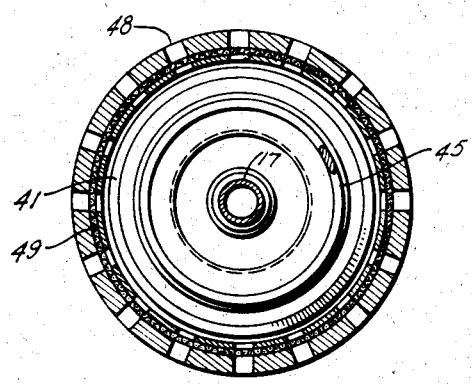
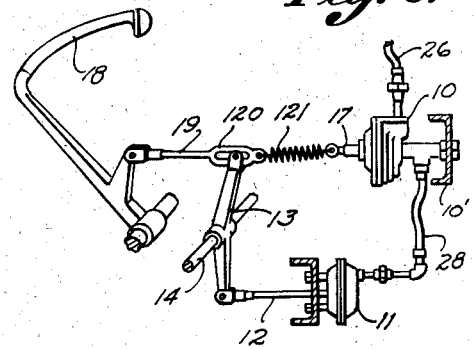
INVENTOR.
Albert E. Roy;
BY Robert W. Fulwider
ATTORNEY.

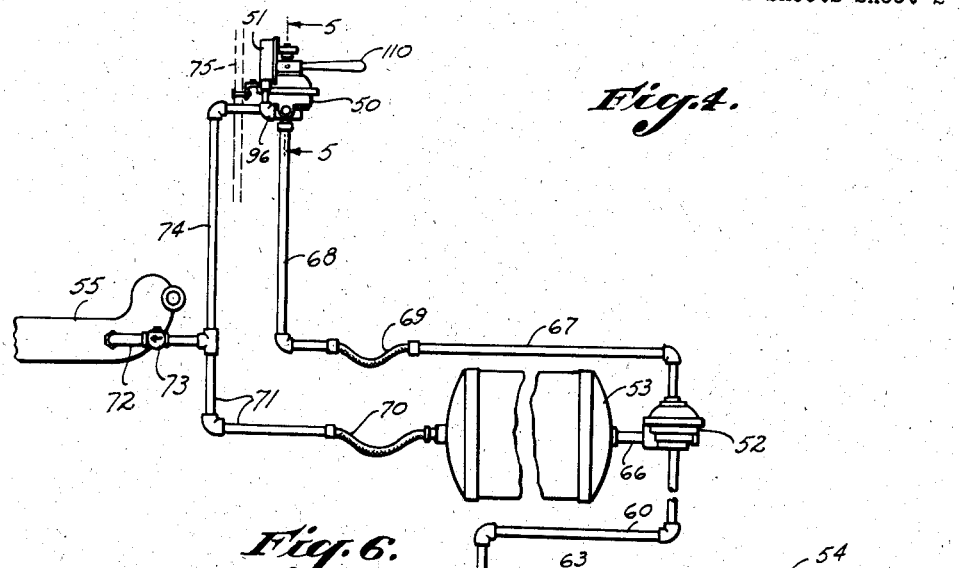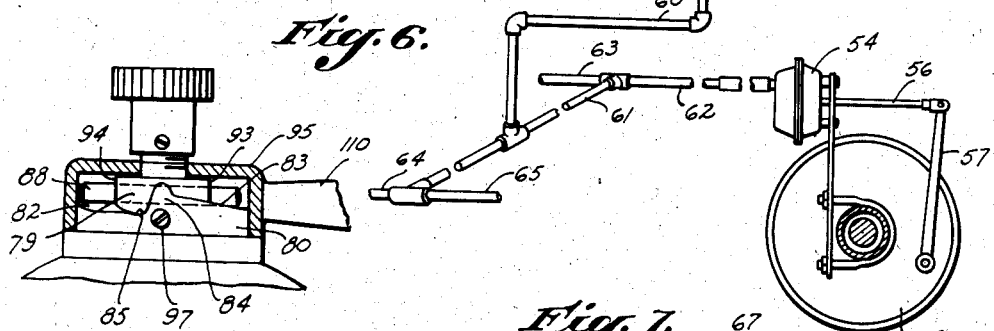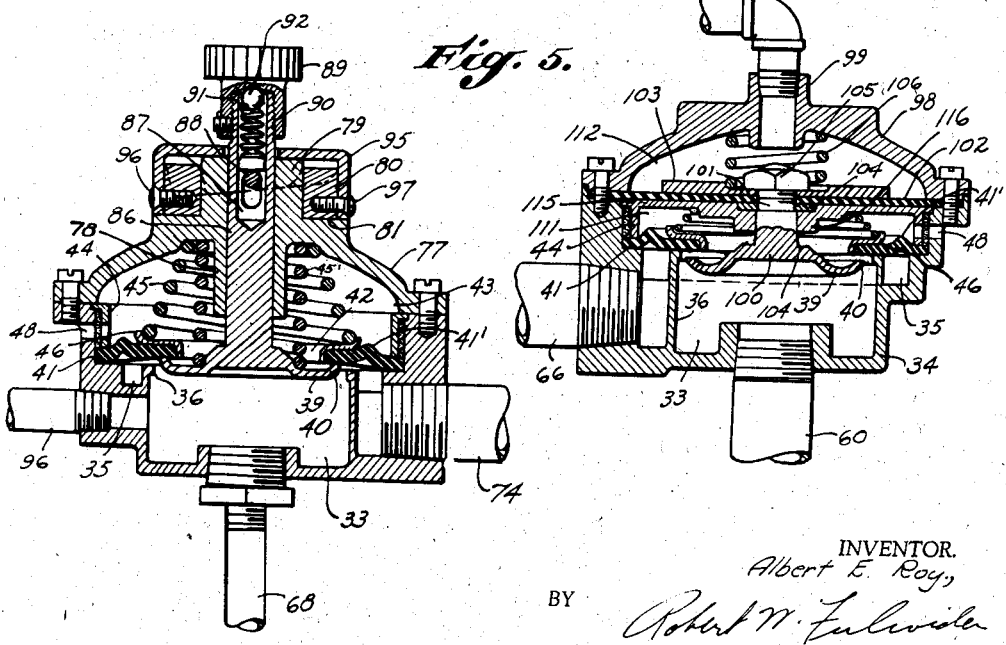

Patented Jan. 24, 1939

2,144,854

UNITED STATES PATENT OFFICE 2,144,854

PNEUMATIC CONTROL APPARATUS

Albert E. Roy, Los Angeles, Calif., assignor to Vacuum Power Brake Company, Los Angeles, Calif., a corporation of California Application May 19, 1937, Serial No. 143,478

12 Claims. (Cl. 303—54)

This invention is a continuation in part of my copending application Serial No. 748,272, filed October 15, 1934 and relates to pneumatic control apparatus and particularly to improvements in control valves of the general type illustrated therein for utilizing the intake manifold vacuum of an internal combustion engine to actuate the brakes of an automobile, truck, trailer, or the like vehicle.

Heretofore in apparatus related to this invention where vacuum-operated vehicle brakes were controlled by means of semi-automatic manually operated valves of the type where the applied braking force is a variable value proportional only to the displacement of the valve control and substantially independent of the duration of such displacement, diaphragm valves have been usually employed for the automatic operation of certain of the essential control mechanisms thereof.

In the employment of diaphragms, and particularly as to continuous diaphragms supported at the edges and center which also serve as valves, certain disadvantages are encountered, such as fluttering, leakage, and sluggish response due apparently to the inertia and internal stresses necessarily developed upon flexure of such structures. Another possible reason for imperfect operation of continuous diaphragms which also serve as valve elements may be due to their natural tendency to periodic fluctuations.

It has been found that control valves of the diaphragm type are more satisfactory and positive in operation when constructed in the form of an annulus combined with positive means for controlling the resistance to flexure and for supporting and retaining the valve seat portion thereof in proper form, free from distortions which may be associated with conventional diaphragm forms. It has also been found that the annular valve of this type is freer from leakage and is longer lived than the conventional continuous diaphragm types.

Objects of this invention, are, therefore, to provide a control valve of improved design which is positive in action, flexible and sensitive in operation, and economical in construction and maintenance.

Another object of this invention is to provide an improved valve means for controlling vacuum actuated apparatus which is substantially free from leakage and mechanically adapted to remain substantially leak-proof over a long period of operation.

It is also an object of my invention to provide an improved method of operating pneumatic control valves which in effect provides an automatic metering or regulation of the amount of vacuum supplied to the brake apparatus.

Other objects, advantages and novel features of my invention will become evident from the following description of a preferred form of my invention and from the accompanying drawings in which:

Fig. 1 is a diagrammatic partial perspective of the general arrangement of an apparatus embodying my invention; Fig. 2 is a longitudinal cross-section of the control valve of Fig. 1 taken along a vertical plane; Fig. 3 is a cross-section of said control valve taken on line 3—3 of Fig. 2; Fig. 4 is a fragmentary side elevation partly in perspective of a general arrangement of modified form of vacuum actuated apparatus and control mechanism as it may be applied in the installation on a trailer; Fig. 5 is a cross-section of a hand-controlled valve taken on line 5—5 of Fig. 4 with the diaphragm shown in an open position and showing the actuating mechanism for regulating the degree of vacuum applied by the valve; Fig. 6 is a fragmentary sectional elevation of the upper portion of the hand-controlled valve of Fig. 4, but viewed at right angles thereto; Fig. 7 is a longitudinal cross-section of the relay control valve shown in Fig. 4 with the elements thereof in their normal or closed positions; and Fig. 8 is a partial perspective corresponding to Fig. 1, but showing a modified form of linkage and valve mounting.

Referring to the drawings and particularly to Fig. 1, the numeral 10 designates a control valve in cross-section in Figs. 2 and 3 which may be attached to any suitable structural member of the vehicle chassis such as 10¹. The numeral 11 designates a booster mechanism which may be of conventional design, and which is preferably rigidly attached to another suitable structural member 11' of the vehicle chassis as illustrated in my copending application Serial No. 748,272. A rod 12 extending from the diaphragm of the booster unit is connected to one end of a crank 13 which is carried on and keyed to a shaft 14 which may be rotatably supported in suitable bearings attached to the vehicle chassis not shown. The opposite end of crank 13 is in turn connected to one end of another crank 15, the opposite end of which is connected to a control rod 16 attached to the stem 17 of the control valve 10. A foot pedal 18 may be connected to an intermediate pivot point of the crank 15 as by means of the rod linkage 19. At the end portions of the shaft 14 are provided double ended cranks 20 and 21 to which are attached pull rods 22—25 which lead to, and actuate the brake mechanisms of the vehicle wheels.

A pipe 26 makes connection between the engine intake manifold 27 and control valve 10. Another pipe 28 makes connection between control valve 10 and the booster unit 11.

Referring to Figs. 2 and 3 in which the control valve 10 is shown in cross-section, the numeral 30 designates a main housing or body portion which is annularly recessed at one end and is capped at that end by a hemispherical cover 31. The before-mentioned recesses in the housing comprise a main approximately cylindrical chamber 33 centrally located within the body portion 30 and in communication through a central opening, and a T connection 34 with the pipe 28, and a minor annular recess 35 concentric with said recess 33 and separated therefrom by a relatively thin annular shoulder 36. The minor annular recess 35 is in communication through the lateral opening 37 with the before-mentioned pipe 26.

A tubular-shaped guide member 38 is axially positioned in the center of the hemispherical cover 31 and serves to guide the control valve stem 17. A mushroom valve head 39, having an annular-shaped upturned valve seat 40, is carried on the inner end of the said valve stem 17 and occupies the forward central portion of the cylindrical chamber 33.

An annular flexible diaphragm 41 having a central opening 42 normally rests across and closes the minor annular chamber 35 by making a substantially air-tight contact with the top surface of the annular dividing shoulder 36. The said flexible diaphragm 41 is held in substantially air-tight contact with the valve body at its outer margin by means of an annular perforated flange 44 which bears upon the said outer edge of the flexible diaphragm under the pressure of the cover 31, which is securely fastened to body portion 30.

A force tending to maintain the flexible diaphragm 41 in a closed position across the chamber 35 and upon the dividing shoulder 36 is positively applied to the inner circular portion of the before-mentioned flexible diaphragm by a helical spring 45 acting against a rigid annular metal washer, 46. The said metal washer 46 carries a downturned edge 46' which fits over the inner edge of the annular diaphragm and serves to define the previously-mentioned opening 42 of the flexible diaphragm 41. A second helical spring 45' surrounds the valve stem guide and bears on the upper face of mushroom valve 39 adjacent its central portion and inside of washer 46 so as to normally urge the valve away from hemispherical cover 31 and out of contact with diaphragm 41.

The valve mechanism is thus normally divided into three sealed chambers, namely; the outer chamber 43, defined by the forward portion of the control valve under the hemispherical cover 31, minor annular chamber 35 which is in communication through recess 37 with the lateral pipe 26, and the centrally positioned major cylindrical chamber 33 which is in communication through the T connection 34 with pipe 28.

The outer chamber 43 is maintained in communication with the atmosphere at all times by means of a plurality of vent holes or ports 48 which extend radially through the flange 44 and the adjacent portion of the valve body as best shown in Fig. 3. A fine mesh screen 49 is provided between the flange 44 and the adjacent body portion to prevent the entrance of dirt through the holes 98 with the air passing into the chamber 43.

The operation of the apparatus illustrated in Figs. 1, 2, and 3 is as follows:

When the elements of the apparatus are in the positions shown in Figs. 1 and 2, the brakes are in their normal or released position and the internal parts of the valve structure are in the positions shown in Fig. 2, that is, the flexible annular valve or diaphragm 41 is seated upon the annular shoulder 36 and closes the minor annular chamber 35, and is held in this position by the combined force of the spring 45 and the differential pressure between the chamber 43 which is at atmospheric pressure and chamber 35 which is at sub-atmospheric pressure by reason of its communication through pipe 26 with the engine intake manifold 27. The seat 40 of the mushroom valve 39 is clear of the annular flexible diaphragm 41 making a passageway therebetween, from the chamber 33 through the central opening 42 to the chamber 43. Air at atmospheric pressure from chamber 43 thus has access to chamber 33 and thence by way of the T connection 34 and pipe 28 to the booster unit 11. Under this condition, both sides of the power diaphragm in the booster unit are at atmospheric pressure and no force is applied to the braking mechanism through rod 12.

When pressure is applied to the foot pedal 18, the resultant forward motion of the rod 19 causes the lever 15 to rotate momentarily in a counter-clockwise direction about the upper end connection of crank 13, which in turn results in a momentary outward motion of the rod 16 and the attached valve stem 17 of the control valve 10. This motion causes the mushroom valve 39 to be moved into contact along its seat 40 with the flexible diaphragm 41 and upon sufficient movement to lift said flexible diaphragm 41 against the force of spring 45 and the vacuum in chamber 35 off of the annular shoulder 36. This results in both closing off communication between chambers 43 and 33 and opening the passageway over the top of the annular shoulder 36 between chambers 35 and 33 whereupon the chamber in the booster unit 11 is put into communication with the sub-atmospheric pressure in the engine intake manifold 27 by way of pipe 28, connection 34, chamber 33, chamber 35, and pipe 26. This results in a momentary reduction of pressure in the power chamber of the booster unit 11 resulting in tension in the rod 12 which in turn causes a counter-clockwise rotational movement of the double ended crank 13 and cranks 20 and 21 upon the shaft 14. The said counter-clockwise rotational movement of the double ended cranks 20 and 21 in turn results in tension in the brake pull rods 22—25 which lead to the brake mechanisms at the vehicle wheels. The before-mentioned counter-clockwise rotational movement of crank 13 also results in a clockwise rotational displacement of the crank 15 about the central rod connection 19' and thus, in inward motion of rod 16 and valve stem 17 into the control valve 10 allowing the reseating of the flexible diaphragm 41 upon the shoulder 36. This reseating of the flexible diaphragm 41 upon the shoulder 36 cuts off further communication between the chambers 35 and 33 and thus between the sub-atmospheric pressure region of the manifold 27 and the working chamber of the booster unit 11. However, the valve rod 17 does not move inwardly enough to cause valve 39 to disconnect from diaphragm 41.

It is thus apparent that for any given depression of the foot pedal 18 resulting in a displacement of the valve mechanism in 10 that a counter-acting or restoring movement of the same valve mechanism is effected by the resultant motion of rod 12 of the booster unit 11 acting through cranks 13 and 15. This results in the application of pressure to the braking mechanism which is proportional only to the deflection or displacement of the brake pedal 18. Overbraking by continued pressure upon the brake pedal is thus obviated.

Upon release of pressure from the brake pedal 18 subsequent to the process of applying the brakes as described hereinabove, the mushroom valve 39 will be relieved of the force acting through the rods 19 and 16 and the valve stem 17, tending to hold it in contact with the flexible diaphragm 41, and it will move inward by reason of the differential pressure between the chamber 43 and chamber 33 and spring 45' until it is again unseated at 40 from the inner surface of the annular flexible diaphragm 41 as shown in Fig. 2, resulting in the opening of the passageway from chamber 43 through the central opening 42 of the diaphragm and around the raised seat 40 of the mushroom valve 39 into the chamber 33. Air at atmospheric pressure is thus enabled to flow through the valve into chamber 33 and thence through pipe 28 to the booster unit 11 resulting in a reduction of force applied through rod 12 and through the before-described associated linkages to the braking mechanism. This reduction of force results in a counter-acting motion through the cranks 13 and 15 resulting in reseating of the valve 39 upon the inner surface of the diaphragm 41 and the cutting off of further inflow of air to the booster unit. The reduction of the braking force is thus obviously also proportional to the backward or restoring motion of the brake pedal 18.

Should the vacuum source fail for any reason, such as breakage of the line 26 or stalling of the engine, the brakes can be directly mechanically operated by applying sufficient pressure upon the pedal 18. This results in initial outward movement of the valve stem 17 to the limit of its motion within the valve housing and from that point on, the force applied to the brake pedal 18 is transmitted directly through the rod 19, thence through the lower portion of the crank 15 to the upper end of crank 13 without aid from the booster unit 11. The force thus applied to the upper end of crank 13 is transmitted through the shaft 14, the double ended cranks 20 and 21 and through the brake pull rods 22—25 as is usual.

Referring now to Fig. 4 which is a modified general arrangement of the apparatus incorporating a relay control valve and which is particularly adapted to installation on a trailer, 50 is a hand-operated control valve having a vacuum gage 51. 52 is a vacuum-operated relay control valve, 53 a vacuum storage tank, 54 is a conventional type of vacuum booster unit such as shown at 11 in Fig. 1, and 55 is a fragmentary view of an engine intake manifold. The vacuum booster unit 54, which is a typical installation for each wheel of the trailer, contains an internal flexible diaphragm to which is attached the brake pull rod 56 which is in turn pivotally attached to the end of the brake mechanism actuating crank 57 of the brake drum 58. The said booster unit 54 is connected to the relay control valve 52 by way of pipes 60 and 61 and branch pipe 62. Other branch pipes 63, 64, and 65 serve to make connection from the relay valve 52 to the other booster units, each of which actuates the braking mechanism for one of the several wheels of the trailer vehicle.

The relay valve 52 is connected by way of pipe 66 to the vacuum storage tank 53, and is also connected to the hand-operated control valve 50 by way of pipes 67, 68 and the flexible coupling 69. The vacuum storage tank 53 is connected to the engine manifold 55, by way of the flexible coupling 70, and pipes 71 and 72. A check valve 73 in pipe 72 serves to prevent the loss of vacuum in the storage tank 53 upon reduction of the vacuum in the engine in take manifold 55. The hand-operated control valve 50 is in communication with the engine manifold 55 and vacuum storage tank 53 by way of connecting pipe 74, pipe 71, and flexible coupling 70.

The hand-operated control valve 50 may be conveniently supported within reach of the operator, inside of the driver's compartment of the towing vehicle upon a suitable structural member 75. The vacuum storage tank 53, relay valve 52, and booster unit 54 with its associated braking mechanism, together with the connecting piping up to the flexible couplings 69 and 70 may be carried by the trailer vehicle, and when so arranged the couplings 69 and 70 constitute the flexible air connections between the towing vehicle and the trailing vehicle.

The hand-operated control valve 50 is shown in detail in cross-section in Fig. 5 and the main body portion thereof is substantially identical with that of the before-described control valve unit 10 shown in section in Fig. 2. The flexible annular diaphragm 41, mushroom valve 39, annular washer 46, helical springs 45 and 45', together with the flange 44 and the plurality of radial holes 48 are also substantially identical to those hereinbefore described in connection with Fig. 2 and, therefore, carry the same identifying numerals.

The hemispherical cover 77 for the body portion of the hand-operated control valve carries a valve stem guide 78 axially positioned and extending on the inside thereof, and on the outside a similar axially positioned cylindrical projection 79 about which is rotatably supported cam ring 80. The lower face of the cam ring 80 has a plane surface resting upon an annular offset bearing surface 81 on the top central portions of the cover 77. As seen best in Fig. 6, the top of the cam ring 80 carries a pair of helical-shaped cam surfaces 82 and 83 each of which extends approximately 180° around the ring and terminates in stop lugs 84 at their raised ends, and recesses 85 at their lower ends. It being found preferable to have the depth of said recesses approximately equal to the desired clearance between valve head 39 and diaphragm 41, so that the valve head 39 is raised to contact diaphragm 41 almost immediately upon movement of the handle 110.

The valve stem 86 of the mushroom valve 39 extends through the valve stem guide 78 and through the external cylindrical projection 79. The outer end portion of the valve stem 86 is tubular in section for a portion of its length and is provided with a diametrally disposed longitudinally elongated slot 87 through which a crosswise positioned pin or cam-riding pin 88 extends.

It will be noted that by having the opposite cam surfaces 82 and 83 that upon movement of the cam ring 80, one end of the pin 88 tends to roll up one cam face, while the other end of the pin tends to roll down the opposite cam face. By this arrangement, the friction between the pin 88 and cam faces 82 and 83 is utilized to keep the cam ring in any fixed position and eliminate the necessity of separate friction devices therefor.

The upper extremity of the tubular portion of the stem 86 is externally threaded to receive a regulator knob 89 having an internally threaded socket 90. A coil spring 91 is retained within the tubular end portion of the valve stem and is normally maintained under compression between the cam riding pin 88 and the ball 92 in the regulator knob socket 90.

The cylindrical projection 79 is slotted at 93 and 94 to receive the cam riding pin 88 and to allow only longitudinal motion hereof upon rotation of the cam ring 80. The extending portions of the cam riding pin 88 are urged against the upper cam surfaces 82 and 83 by the spring 91 which is under compression and at the same time urges the valve stem 86 and the seat 40 of the mushroom valve 39 upward with equal force against the inner marginal valve seat portion of the under surface of the annular flexible diaphragm 41. The force with which the valve 39 bears against the diaphragm 41 may thus be adjusted by the regulator knob 89 and controlled at will by movement of the position of the cam ring 80.

The cam ring 80 is operated by a handle 110 which extends radially from an inverted cup-shaped central hub portion 95, which encloses the cam ring and retains the cam riding pin 88. Said hub portion 95 is attached in a fixed relation to the cam ring 80 by means of set screws 96 and 97, and the cam ring may be thus rotated by application of force to the handle 110. The upper end of the valve stem 86 which carries the adjusting knob 89 extends through a central opening in the hub portion 95.

As described hereinbefore in connection with the foot valve of Fig. 2, the hand-operated control valve 50 of Fig. 5 is normally divided into three chambers, namely, chamber 43, which is in communication with the atmosphere through the plurality of radial vent holes 48, the annular chamber 35, which is in communication with the engine manifold 55 and the vacuum storage tank 53 by way of pipes 74, and the central chamber 33, which is in communication with the relay valve 52 by way of the pipe 68. A vacuum indicating gage 51 may be connected to the chamber 33 by pipe 96, and serves to visually indicate the braking force being applied through the valve.

Referring to Fig. 7 which illustrates the relay valve 52 in cross-sectional view, the lower body portion thereof is identical with the lower body portion of the control valve 10 as shown in Fig. 2. The hemispherical cover 98 is generally similar to that illustrated in Figs. 2 and 5 but instead of having a valve guide through the central portion thereof a pipe connection 99 is substituted, from which the pipe 67 extends to the control valve 50. The annular flexible diaphragm 41, the annular washer 46 and the mushroom valve 39 are all similar to those same elements in Figs. 2 and 5 and, therefore, bear the same identifying numbers. The valve stem 100 extending upwardly from the mushroom valve 39 is shorter than the ones illustrated in the other types of valves and terminates in a threaded portion 101 within the enclosure of the hemispherical cover 98.

Spaced above the diaphragm 41 is a circular plate 115 provided with flanges 44 and adapted to be rigidly held between cover 98 and body portion 34 of the valve mechanism. The plate 115 preferably has a downwardly extending boss 116 at its center which is apertured to receive the valve stem 100. The upper face of the plate 115 is recessed around the central aperture to accommodate a washer 104 which fits snugly around the reduced threaded portion 101 of stem 100. A flexible diaphragm 102 lies on plate 115 and has its marginal edges clamped under cover 98. The central portion of the diaphragm 102 has an opening concentric with the central aperture of plate 115 to accommodate valve stem portion 101, and is secured by means of a nut 105 clamped between upper washer 103 and lower washer 104 which fits in the before-mentioned recess in plate 115. The diaphragm 102 thus divides the upper portion of the relay valve into two separate chambers illustrated at 111 and 112.

A coil spring 106 is interposed between the washer 103 and the top of the cover 98. A helical spring 107 is interposed between the annular washer 46 and the underside of plate 115 which serves to retain the flexible diaphragm 41 in normal sealing contact with the shoulder 36.

Chamber 111 formed between the diaphragm 102 and the diaphragm 41 together with the mushroom valve 39, is vented to the atmosphere through a plurality of radial vent holes 48 arranged around the body portion of the valve as also illustrated and described in Figs. 2 and 5.

The relay valve as illustrated in Fig. 7 is thus normally divided into four chambers namely the uppermost chamber 112 communicating with the pipe 67 leading to the control valve, the intermediate chamber 111 communicating with the atmosphere through the vent holes 48 and thus remaining at atmospheric pressure, the annular minor chamber 35 in communication with the vacuum storage tank 53 through pipe 66 and the major central cylindrical chamber 33 in communication with the vacuum booster unit 54 through pipe 60.

The flexible annular diaphragm 41 shown in Figs. 2, 5, and 7 may be composed of any suitable material such as rubber, duprene, or the like. It will be noted that in each instance I have shown the diaphragm as provided with a small annular crimp or hip 41'. By reason of this hip 41', it is possible to securely clamp the outer margin of the diaphragm and still allow free and adequate movement of the central portion of the diaphragm without stretching the same. As will be evident, this eliminates substantially all internal stresses yet gives plenty of flexibility without fluttering, and results in a valve with a high degree of sensitiveness with a minimum amount of wear on the parts.

The operation of the apparatus of Figs. 4–7 is as follows:

Assuming that there is a sub-atmospheric pressure in the tank 53 and that the brakes are released, the relay valve mechanism of Fig. 7 will be in the position shown therein, and the hand control valve mechanism of Fig. 5 will also be in a like position with the flexible annular diaphragm seated upon the shoulder 36 and closing the annular chamber 35, and the mushroom valve 39 will be unseated from the under surface of said flexible diaphragm 41 and in an open position contrary to the position of those same elements as illustrated in Fig. 5. Upon turning the handle 110 and the attached cam ring 80 to raise the valve 39 against the under surface of the annular flexible diaphragm 41 the position of the elements as shown in Fig. 5 will obtain. This results in closing off the main booster line 68 from the atmosphere and in opening a passageway between chambers 35 and 33 by raising the flexible diaphragm 41 off of the dividing shoulder 36 and thus putting chamber 112 of the relay valve unit 52 in communication with the region of sub-atmospheric pressure in the intake manifold 55 and storage tank 53 by way of pipe 67, flexible coupling 69 and pipes 68 and 74.

It is to be noted that the force of the cam 80 is transmitted to the valve 39 through the coil spring 91 which deflects under compression so that it tends to yield under the combined opposing force of the helical spring 45 and the differential pressure between chambers 43 and 33. As the valve 39 in response to motion of the handle 110 and the cam ring 80 moves upward carrying with it the flexible diaphragm 41, the differential pressure between chambers 43 and 33 is increased by reason of the communication thus established between the chamber 33 and the sub-atmospheric pressure in chamber 35. This increase in differential pressure acting upon the flexible diaphragm 41 and upon the mushroom valve 39 increases the loading and hence the deflection of the coil spring 91. When the pressure differential has thus become sufficiently great, the deflection of the coil spring 91 will be sufficient to allow the flexible diaphragm 41 to reseat upon the annular shoulder 36 and thus to cut off further reduction of pressure in chamber 33.

This variation in the degree of vacuum in the chamber 33 as controlled by the handle 110 is transmitted through the pipes 68 and 67 to the chamber 112 of the relay valve 52 shown in Fig. 7. Since the chamber 111 is always maintained at atmospheric pressure by reason of the vent holes 48 leading to the outside of the valve, any such variation in pressure in the chamber 112 caused by the control valve 50 as described hereinbefore will result in a deflection of the diaphragm 102 causing the valve stem 100 and the attached mushroom valve 39 to follow exactly those corresponding movements of the valve 39 in the before-described control valve 50. The valve mechanism of the relay valve thus operates in the same manner as the same valve mechanism in the control units illustrated in Figs. 2 and 5, to vary the degree of vacuum in the chamber 33. Since the chamber 33 is in communication with the booster units 54, through the pipes 60–65 the said variation in pressure results in a corresponding braking action upon the various braking mechanisms of the vehicle wheels.

Thus the braking force applied to the vehicle may be remotely controlled by means of the hand-operated control valve 50 through the action of the relay valve 52, and the magnitude of such resultant braking force is proportional only to the angular displacement of the control lever 110, which may be set and allowed to remain in any given position without increasing the braking force beyond the value corresponding to such displacement. The maximum braking force applied to the booster units for any given angular displacement of the control handle 110 is adjustable by the threaded knob 89 which acts to increase or decrease the initial compressive force acting upon the coil spring 91.

If desired, the relay valve 52 may be omitted and the main booster line 60, may be connected directly to the hand control valve through line 68. This omission of the relay valve may be desirable in some cases where the braking mechanisms to be operated are on the main vehicle in which the control valve 50 is installed, however, in the case of the installation upon a trailer vehicle, the provision for a relay valve unit as illustrated in Fig. 4 may be desirable.

From the foregoing, it will be seen that both the foot valve installation of Fig. 2 and the hand valve structure of Fig. 5 are automatically compensating, and that the pressure applied to the brakes through the booster is always proportional to the displacement of the power member, whether it be the foot pedal 18 or handle 110.

In Fig. 8, I have illustrated a modified form of mounting for the foot valve of Fig. 2 which partakes of the feature shown in both Fig. 1 and Fig. 5. Giving the same numerals to like parts found in Fig. 1, I have a brake pedal 18, brake rod 19, crank 13, shaft 14, booster 11, booster rod 12, foot valve 10 with valve stem 17, bracket 10', and pipe connections 26 and 28 leading from the valve 10. In this instance, however, the intermediate crank 15 is eliminated and the rod 19 is provided with a slot 120, pin connected to the upper arm of crank 13, and also connected by a spring 121 to valve stem 17. The spring 121 functions similarly to spring 91 in the hand valve 50 to yieldably pull valve stem 17 and valve 39 outwardly against the force of springs 45 and 45' and the differential pressures in the valve. When sub-atmospheric pressure has been established in chambers 33 to the desired point in response to a given displacement of the brake pedal 18, the spring 121 yields and the valve diaphragm 41 reseats on its shoulder 36, thus giving a compensated braking force. If the valve does not function, continued movement of the brake pedal causes the end of the slot 120 to engage crank 13 and operate the brakes directly.

It is to be understood that the foregoing is merely illustrative of preferred embodiments of my invention, and that numerous variations apparent to those skilled in the art may be made in the forms shown without departing from the invention as defined by the appended claims.

I claim as my invention:

1. In a vacuum-operated braking system for vehicles, a control valve comprising; a housing consisting of a recessed body portion and a cover for said recessed body portion; an annular shoulder in said recessed body portion defining an outer annular chamber and a coaxial central chamber; a circular annular-shaped flexible diaphragm, having a concentric circular central opening, fixed at its outer edge and normally covering said annular chamber and a portion of said central chamber; a circular valve head in said central chamber covering the central opening in said annular-shaped flexible diapragm, said flexible diaphragm and said circular valve forming a partition in the housing between said body portion and said cover, said partition defining an additional chamber under said cover in communication with the atmosphere; and means to move said valve and said flexible diaphragm whereby communication may be alternately established thereby between said central chamber and said annular chamber and between said central chamber and said atmospheric chamber.

2. In a vacuum-operated braking system for vehicles, a control valve comprising: a housing consisting of a recessed body portion and a cover for said recessed body portion; an annular shoulder in said recessed body defining an outer annular chamber and a coaxial central chamber;

an annular-shaped flexible diaphragm fixed at its outer edge and normally covering said annular chamber and a portion of said central chamber; an annular ring in contact with the inner periphery of said flexible diaphragm; a spring seating upon said ring and urging said flexible diaphragm toward contact with said annular shoulder; a circular valve head in said central chamber covering the central opening in said annular-shaped flexible diaphragm, said flexible diaphragm and said circular valve forming a partition in the housing between said body portion and said cover, said partition defining an additional chamber under said cover in communication with the atmosphere; and means to move said valve and said flexible diaphragm whereby communication may be alternately established thereby between said central chamber and said annular chamber and between said central chamber and said atmospheric chamber.

3. In a vacuum-operated braking system for vehicles, a control valve comprising: a housing consisting of a recessed body portion and a cover for said recessed body portion; an annular shoulder in said recessed body defining an outer annular chamber and a coaxial central chamber; a circular annular-shaped flexible diaphragm, having a concentric circular central opening, fixed at its outer edge and normally covering said annular chamber and a portion of said central chamber; a circular valve head in said central chamber covering the central opening in said annular-shaped flexible diaphragm, said flexible diaphragm and said circular valve forming a partition in the housing between said body portion and said cover, said partition defining an additional chamber in communication with the atmosphere; and elastic means to move said circular valve and said flexible diaphragm whereby communication may be alternately established thereby between said central chamber and said annular chamber and between said central chamber and said atmospheric chamber.

4. Apparatus as set forth in claim 3 in which the elastic means to move said circular valve comprises an expansible chamber in said housing adapted to receive air under variable pressure.

5. Apparatus as set forth in claim 3 in which the elastic means to move said circular valve comprises a spring and means to apply a variable force to said spring.

6. In a vacuum-operated braking system for vehicles, a control valve comprising: a housing consisting of a recessed body portion and a cover for said recessed body portion; an annular shoulder in said recessed body defining an outer annular chamber and a coaxial central chamber; a circular annular-shaped flexible diaphragm, having a concentric circular central opening, fixed at its outer edge between said body and cover and normally covering said annular chamber and a portion of said central chamber; a circular valve head in said central chamber covering the central opening in said annular-shaped flexible diaphragm, said flexible diaphragm and said circular valve forming a partition in the housing between said body portion and said cover, said partition defining an additional chamber in communication with the atmosphere; a valve stem attached at one end to said circular valve; a spring at the opposite end of said valve stem; and means to apply a variable force through said spring to said valve stem to move said circular valve whereby communication may be alternately established thereby between said central chamber and said annular chamber and between said central chamber and said atmospheric chamber.

7. In a vacuum-operated braking system for vehicles, a control valve comprising: a housing consisting of a recessed body portion and a cover for said recessed body portion; an annular shoulder in said recessed body portion defining an outer annular chamber and a coaxial central chamber; a circular annular-shaped flexible diaphragm, having a concentric circular central opening fixed at its outer edge between said body and cover and normally covering said annular chamber and a portion of said central chamber; a circular valve head in said central chamber covering the central opening in said annular-shaped flexible diaphragm, said flexible diaphragm and said circular valve formng a partition in the housing between said body portion and said cover, said partition defining an additional chamber in communication with the atmosphere; a valve stem attached at its end to said circular valve; a spring at the opposite end of said valve stem; and cam means to apply a variable force through said spring to said valve stem to move said circular valve whereby communication may be alternately established thereby between said central chamber and said annular chamber and between said central chamber and said atmospheric chamber.

8. In a vacuum-operated braking system for vehicles, a control valve comprising: a housing consisting of a recessed body portion and a cover for said recessed body portion; an annular shoulder in said recessed body defining an outer annular chamber and a coaxial central chamber; an annular-shaped flexible diaphragm fixed at its outer edge between said body portion and said cover and normally covering said annular chamber and a portion of said central chamber; an annular metal ring in contact with the inner periphery of the said flexible diaphragm; a spring seating upon said metal ring and urging said flexible diaphragm toward contact with said annular shoulder; a circular valve head in said central chamber covering the central opening in said annular-shaped flexible diaphragm, said flexible diaphragm and said circular valve forming a partition in the housing between said body portion and said cover, said partition defining an additional chamber under said cover in communication with the atmosphere; a second spring attached to said circular valve; means to apply a variable force to said circular valve through said second spring to move said valve and said flexible diaphragm whereby communication may be established thereby from said central chamber alternately to said annular chamber and to said atmospheric chamber.

9. In a vacuum-operated braking system for vehicles, a control valve comprising: a housing consisting of a recessed body portion and a cover for said recessed body portion; an annular shoulder in said recessed body portion defining an outer annular chamber and a coaxial central chamber; an annular-shaped flexible diaphragm fixed at its outer edge and normally covering said annular chamber and a portion of said central chamber; a circular valve head in said central chamber covering the central opening in said annular-shaped flexible diaphragm, said flexible diaphragm and said circular valve forming a partition in the housing between said body portion and said cover, said partition defining an additional chamber in communication with the atmosphere; a valve stem attached at one end to said circular valve; a tubular section at the opposite end of the valve stem; a coil spring in said tubular section; means to apply a variable force to said valve stem through said coil spring to move said circular valve whereby communication may be alternately established thereby between said central chamber and said annular chamber and between said central chamber and said atmospheric chamber.

10. In a vacuum-operated braking system for vehicles, a control valve comprising: a housing consisting of a recessed body portion and a cover for said recessed body portion; an annular shoulder in said recessed body portion defining an outer annular chamber and a coaxial central chamber; an annular-shaped flexible diaphragm fixed at its outer edge between said body and cover and normally covering said annular chamber and a portion of said central chamber; a circular valve head in said central chamber covering the central opening in said annular-shaped flexible diaphragm, said flexible diaphragm and said circular valve forming a partition in the housing between said body portion and said cover, said partition defining an additional chamber in communication with the atmosphere; a valve stem attached at its one end to said circular valve; a tubular section at the opposite end of said valve stem; a coil spring in said tubular section; adjustable means to apply an initial compressive force to said coil spring; separate means to apply a variable force to said valve stem through said coil spring to move said circular valve whereby communication may be alternately established thereby between said central chamber and said annular chamber and between said central chamber and said atmospheric chamber.

11. In a vacuum-operated braking system for vehicles, a control valve comprising: a housing consisting of a recessed body portion and a cover therefor; an annular shoulder in said body portion defining an outer annular chamber and a coaxial central chamber; an annular-shaped flexible diaphragm fixedly supported in said housing across said chambers, said diaphragm being provided with an annular hip adjacent its outer edge; a valve head disposed below said diaphragm with its stem extending therethrough, said diaphragm and said head together forming a partition in the housing, said partition defining an additional chamber in said housing and in communication with the atmosphere; and means to move said valve head and diaphragm to alternately establish communication between said central chamber and said annular chamber and between said central chamber and said atmospheric chamber.

12. In a vacuum-operated braking system for vehicles, a control valve comprising: a housing consisting of a recessed body portion and a cover therefor; an annular shoulder in said body portion defining an outer annular chamber and a coaxial central chamber; an annular-shaped flexible diaphragm fixedly supported in said housing across said chambers, a valve head disposed below said diaphragm with its stem extending therethrough, said diaphragm and said head together forming a partition in the housing, said partition defining an additional chamber in said housing and in communication with the atmosphere, and means to move said valve head and diaphragm to alternately establish communication between said central chamber and said annular chamber and between said central chamber and said atmospheric chamber.

ALBERT E. ROY.